United States Patent [19]

Stornes

[11] Patent Number: 5,211,545
[45] Date of Patent: May 18, 1993

[54] ARRANGEMENT FOR FEEDING WATER INTO A RESERVOIR

[76] Inventor: Ola Stornes, 6630 Ungvoll, N-6630 Tingvoll, Norway

[21] Appl. No.: 861,611

[22] Filed: Apr. 1, 1992

[30] Foreign Application Priority Data

Apr. 11, 1991 [NO] Norway .................................. 911405

[51] Int. Cl.$^5$ ............................................. F04B 35/02
[52] U.S. Cl. .................................. 417/330; 417/100; 417/103
[58] Field of Search .................. 417/330, 92, 100, 103

[56] References Cited

U.S. PATENT DOCUMENTS

| | | | |
|---|---|---|---|
| 1,175,287 | 3/1916 | Olmsted | 417/330 |
| 5,027,000 | 6/1971 | Chino et al. | 417/330 |

FOREIGN PATENT DOCUMENTS 0894961  1/1945  France .................................. 417/330

Primary Examiner—Richard A. Bertsch
Assistant Examiner—Charles G. Freay
Attorney, Agent, or Firm—Francis C. Hand

[57] ABSTRACT

Arrangement for feeding water into a reservoir located at a level above that of the ocean by utilising energy produced by the movement of waves thereof. An air cushion-forming portion of a first chamber communicates with an air cushion-forming portion of a second chamber. Water is supplied to the second chamber via an intake pipe and associated back pressure valves plus adjacent rising pipe. As a result of equivalent pressure variations in the first and second air cushion-forming portions caused by movement of the waves, water is lifted from the second chamber in a pipe via additional back pressure valves along with a further rising pipe plus pump to a higher lying, third chamber and from there to the reservoir.

8 Claims, 1 Drawing Sheet

U.S. Patent
May 18, 1993
5,211,545
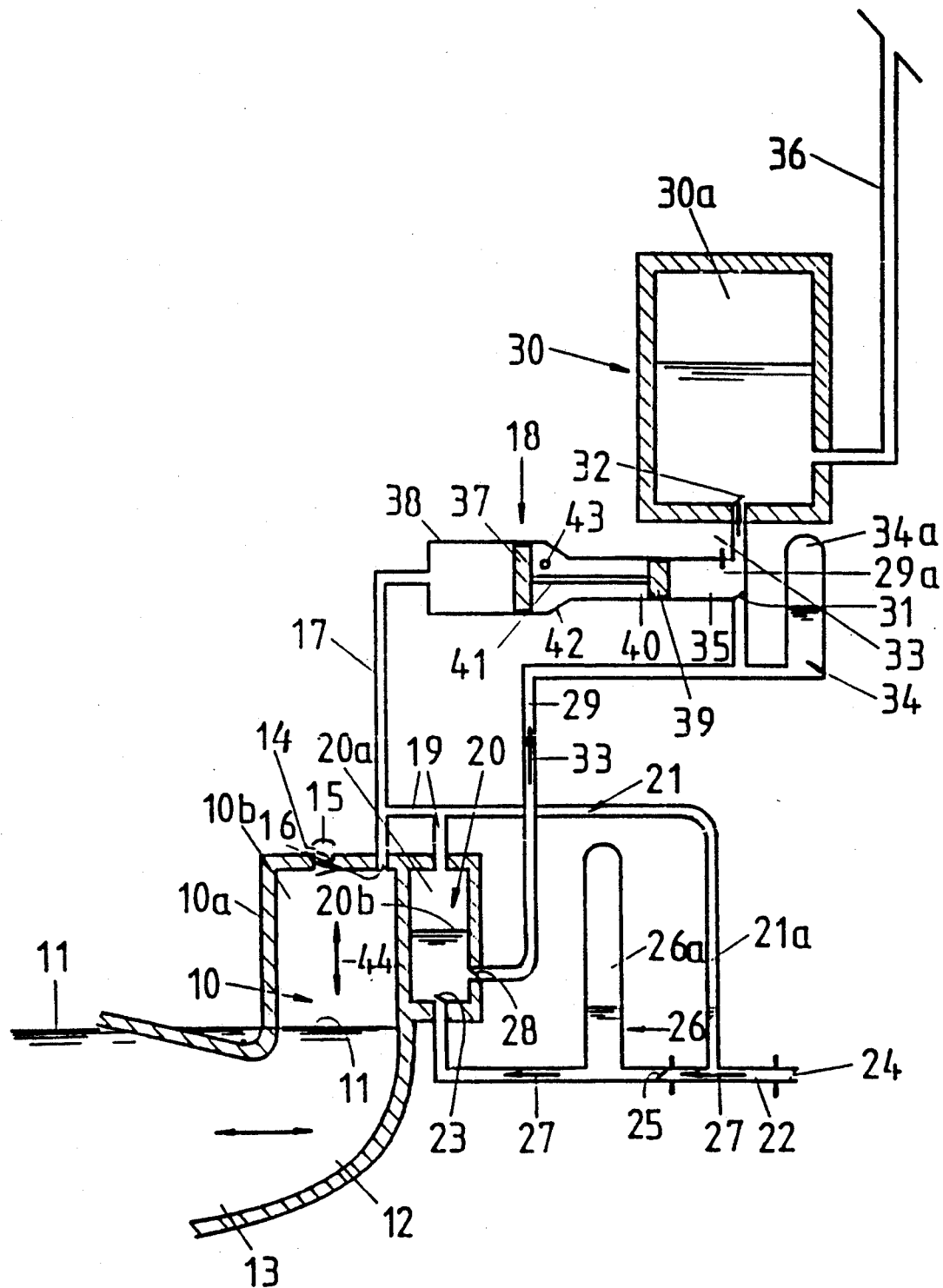

5,211,545

ARRANGEMENT FOR FEEDING WATER INTO A RESERVOIR

BACKGROUND OF THE INVENTION

1. Field of the Invention

This invention relates to an arrangement for feeding water from an ocean into a reservoir located at a level above that of the ocean by utilising energy produced by the movement of waves thereof.

2. Description of the Related Art

The present invention constitutes a further development of arrangements as shown in Norwegian Laid Open Specification No. 143,681 and Norwegian Patent Specification No. 156,338.

With the present invention the particular aim is a solution, whereby the energy of wave movement can be utilised with heavy wave movements as well as with relatively weak wave movements. The objective is in other words a special effort to be able to utilise the energy of movement of relatively weak wave movements, so that the arrangement can be maintained in operation even with large variations in the wave movements and even with relatively low wave movements. This involves being able to maintain the arrangement in operation over longer time periods than with earlier proposed solutions and with that with greater working effect.

With the known solutions it has been found that the reduced pressure, which arises in the work chamber with relatively low wave movements, is not sufficient to ensure sucking in of water into the work chamber. With the present invention the aim is a solution, with which drawing in of water into the work chamber can be guaranteed even with low wave movements by providing for an extra build up of a water pressure in front of the suction opening of the work chamber.

SUMMARY OF THE INVENTION

According to the present invention an arrangement for feeding water into a reservoir located at a level above that of the ocean by utilising energy produced by the movement of waves thereof comprises:

(a) a first chamber adapted to be closed below by water from the ocean enabling the ocean water level in the chamber to be raised and lowered in unison with the movement of the waves, said first chamber having above its water level, a first air cushion-forming portion within which air can be compressed or expanded in response to piston-like movements of the water level, (b) a second chamber annexed to the first chamber and for receiving water from below, via a first back pressure valve, from a separate water intake conduit, said second chamber having above its water level, a second air cushion-forming portion in communication with the first air cushion-forming portion of the first chamber, (c) means for lifting water to the higher lying reservoir which are adapted to respond to equivalent variations of pressure in the first and second air cushion-forming portions of the respective first and second chambers caused by movement of the waves and while under step-by-step control by back pressure valves thereof, and (d) a first rising pipe connected to the water intake conduit between back pressure valves disposed upstream of the second chamber, said rising pipe communicating above with the first air cushion-forming portion of the first chamber for building up extra water pressure upstream of the adjacent back pressure valve of the second chamber.

According to the invention one has ensured in a ready manner a positive build up of an extra water pressure downstream of the first back pressure valve, so that on a reduced pressure subsequently occurring in the air cushion of the work chamber, this extra water pressure can assist with opening the first back pressure valve for supplying water to the work chamber. With subsequent excess pressure in the air cushion above the water level in the work chamber, that water, which is fed extra to the work chamber, is pressed further upwards in the water-lifting means.

It is preferred according to the invention that in the water intake conduit downstream of the rising pipe open above, which is located between a second and a third back pressure valve, a rising pipe closed above is arranged, which is arranged between the first back pressure valve and the third back pressure valve.

By this, provision is made in a ready manner for the gradual build up of the water pressure upstream of the work chamber, so that the extra water pressure can be supplied to the work chamber in a reliable manner with each of the wave movements of the ocean.

BRIEF DESCRIPTION OF THE DRAWINGS

In order that the invention can be more clearly understood, a preferred embodiment thereof will now be described, by way of example, with reference to the accompanying drawing which is a schematic representation, partially in section, of an arrangement for feeding water into a reservoir located at a level above that of the ocean.

Referring to the drawing, there is shown a closed chamber 10, for example in the form of a tank or a tunnel, which is bored into a mountain. The chamber 10 is closed below by a level of water 11, which moves vertically in step with the ocean outside the chamber 10. In this connection, the chamber 10 is defined by a housing 10a opening downwardly with knee-shaped deflection 12 to a funnel-shaped inlet opening 13, which opens outwardly towards the ocean present outside, which is indicated by the water level 11. The chamber 10 also defines an air cushion-forming portion 10b above the level of water 11.

At the top of the chamber 10, there is an air flow duct 14 to fresh air via a combined excess pressure/reduced pressure valve 15 and an air flow pipe 16 to an air control system, which will be described in further detail below.

A first branch conduit 17 extends from the air flow pipe 16 in open connection to the one, low pressure end of a low pressure/high pressure pump or piston-cylinder-arrangement 18. A second branch conduit 19 extends from the air flow pipe 16 in open connection to an upper end of a first work chamber 20 and, specifically, to an air cushion-forming portion of the chamber 20. This work chamber 20 is arranged just by the side of the chamber 10. A third branch conduit 21, which branches off from the branch conduit 19, is connected to a water intake conduit 22, which is connected to the work chamber 20 at the bottom of the latter via a first back pressure valve 23. A second back pressure valve 24 is arranged at the opposite (upstream) end of the intake conduit 22 and a third back pressure valve 25 in the water intake conduit 22 a distance inside (downstream of) back pressure valve 24. More specifically, the branch conduit 21 is connected to the water intake conduit 22 in a region between the back pressure valves 24 and 25. The three branch conduits 17, 19, 21 are consequently directly connected to the upper, air-cushion forming portion 10b of the chamber 10 and the pressure in the three branch conduits 17, 19, 21 has consequently a pressure which corresponds to the pressure in the air cushion portion 10b of the chamber 10.

The lower portion 21a of the branch conduit 21 forms a first vertical rising pipe open above. In the water intake pipe 22 between the back pressure valves 23 and 24 there is branched off a second vertical rising pipe 26 closed (dead ending) above. The rising pipes 21a and 26, together with adjacent back pressure valves 25, 24, 23, provide for being able to build up gradually an extra water pressure, separately and in succession in front of the valves 25 and 23 respectively by means of the quantities of water which have to be present in the rising pipes 21a and 26 between each pair of back pressure valves 24, 25 and 23, 25. This extra water pressure can be applied each time a vacuum is formed in the chamber 10 to press the water gradually past the valves 25 and 23 in a direction towards the work chamber 20.

The back pressure valves 23, 24, 25 are normally closed during operation and all open in the direction of flow of the water, as shown by the arrows 27, by the increase of the water pressure upstream in front of the valves or by that reduced pressure which arises downstream behind the valves.

From the lower end of the work chamber 20 there extends via a fourth back pressure valve 28 of a water-lifting arrangement, a water guide pipe 29 to a second, upper work chamber 30 via a fifth back pressure valve 31 and a sixth back pressure valve 32. The back pressure valves 28, 31, 32 are normally closed during operation and all open in the direction of flow of the water, as shown by arrows 33 with increasing water pressure upstream in front of the respective valve 28, 31, 32 and with a relatively lower pressure arising downstream of the respective valve. Just in front of the back pressure valve 31, the guide pipe 29 is branched off with a third rising pipe 34 closed above, which in a corresponding manner to the rising pipes 21a and 26, can by way of an air cushion 34a in the rising pipe assist with the building up of an extra water pressure in front of the valve 31, by means of an extra amount of water which is built up in the region between the valves 28 and 31.

In the upper end 29a of the guide pipe 29, that is to say between the back pressure valves 31, 32 there is a branch conduit 35 to the other, high pressure end of the low pressure/high pressure pump or piston-cylinder-arrangement 18. By mean of the piston-cylinder-arrangement 18, an additional water pressure can be built up separately in the upper end 29a of the guide pipe 29 in order to force the water via the valve 32 upwardly into the work chamber 30.

From the lower portion of the work chamber 30 there extends a water guide pipe 36 to a downstream (not shown further) water reservoir lying above. A resilient air cushion 30a uppermost in the chamber 30 provides for the amount of water, which is pressed into the work chamber 30, to be pressed further upwards through the water guide pipe 36 to the water reservoir.

The water reservoir can in a manner known per se supply water under pressure to an electrical water power plant (not shown further) known per se.

The piston-cylinder-arrangement 18 comprises a low pressure piston 37 received in a low pressure cylinder 38 and a high pressure piston 39 received in a high pressure cylinder 40. The pistons 37 and 39 are mutually rigidly connected to each other via a piston rod 41. In a transition portion 42 between the cylinders 38, 40 air openings 43 are shown to fresh air for equalising pressure variations in the transition between the cylinders 38, 40.

The mode of operation of the arrangement as illustrated in the drawing is as follows:

With movement of the water level 11 upwards and downwards in the chamber 10 in step with the movements of the waves in the ocean outside the housing 10a, as is indicated by the double arrow 44, there is alternately produced excess pressure and reduced pressure in the air cushion-forming portion 10b in the chamber 10. This alternating excess pressure and reduced pressure-which can have different values all according to the wave movements of the ocean-transmits itself with corresponding pressure to the low pressure cylinder 38 and to the air cushion 20a at the top of the first work chamber 20 and also to the upstream inlet end of the intake pipe 22 to the region between the back pressure valves 24, 25.

With relatively powerful wave movements in the ocean, the pressure variatons, which are transmitted to a water level 20b in the work chamber 20, will cause the valve 28 and the valves 31, 32 to be opened and water to be discharged into the second work chamber 30. Gradually, as the pressure increases in an air cushion 30a in the second work chamber 30, the water under pressure will be pressed by the air cushion 30a in the chamber 30 upwardly through the pipe 36 to a higher lying water reservoir.

With relatively weak wave movements in the ocean, the vacuum arising in the air cushion 10b in the chamber 10 and in the air cushion 20a in the adjacent work chamber 20 will not be sufficient to obtain an intended high pressure in the water-lifting arrangement, that is to say the work chamber 20 will not be immediately filled with water correspondingly easily as with strong wave movements. In this connection, provision is made for extra devices (the rising pipes 21a, 26, 34) in combination with adjacent back pressure valves 25, 24 or 24, 23 and 28, 31) to achieve the desired pressure build up in the water-lifting arrangement.

On reduced pressure arising in the air cushion 10b in the chamber 10, provision is made for water to be first sucked into the rising pipe 21a in the lower portion of the branch conduit pipe 21, as a consequence of opening of the valve 24 with a drop in pressure in the pipe 21. With subsequent excess pressure in the chamber 10, the valve 24 is closed, while the valve 25 opens and water flows from the rising pipe 21a past the valve 25 and further for one thing to the rising pipe 26. By means of an air cushion 26a in the rising pipe 26 a resilient air cushion volume can be formed in the rising pipe 26 for building up an increased quantity of water and increased water pressure upstream of the valve 23. In this phase, the valve 23 remains closed, the pressure in the work chamber 20 and in the pipe 21 being correspondingly high. When reduced pressure is again formed in the air cushion 10b in the chamber 10, the reduced pressure transmits itself to the air cushion 20a in the work chamber 20. By means of the pressure build up, which has taken place upstream in front of the valve 23, opening of the valve 23 is ensured in connection with the reduced pressure which then prevails in the work chamber 20 and extra water is supplied to the work chamber 20 from the rising pipe 26 via the valve 23. It will be understood that the gradual build up of extra water pressure in the rising pipes 21a and 26 takes place one after the other in its respective work step, but nevertheless so that an extra water pressure arises in front of the valve 23 with each individual wave impact which transmits itself to the chamber 10. Gradually, as the pressure is built up in the work chamber 20, the water is pressed further via the valve 28 and the guide pipe 29 to the rising pipe 34 and thereafter further to the chamber 30 via the valves 31, 32. At the same time that water is forced upwardly through the guide pipe 29 from the chamber 20, the rising pipe 34 and the valves 28, 31 provide for building up the pressure in front of the valve 31, so that the water can be forced further upwards in the upper end 29a of the pipe 29. At the same time herewith, the piston-cylinder-arrangement 18 provides, after an extra amount of water is supplied to the upper end 29a of the pipe 29 via the valve 31 in the suction phase of the arrangement 18, to increase the water pressure in the branch conduit 35 between the valves 31, 32 in the pressure phase of the arrangement 18, so that an extra build up of pressure is obtained in the work chamber 30 and the water can thereby be pressed further upwards via the pipe 36 to the water reservoir. In other words high pressure piston 39 in the cylinder 40 (with reduced pressure in the chamber 10 and thereby in the cylinder 38) will first suck water via the valve 31 inwardly into the upper end 29a of the pipe 29, and thereafter (with excess pressure in the chamber 10 and thereby in the cylinder 38) close the valve 31 and open the valve 32 and force water further via the work chamber 30 and further upwardly in the guide pipe 36 to the water reservoir.

With this, one has the possibility to obtain sufficient lifting pressure in the upper end 29a of the pipe 29 in order to lift water completely upwards to the water reservoir via the work chamber 30 without additional lifting devices. However it will also be possible to employ additional arrangements (not shown further) corresponding to the arrangement 18, arranged at a higher lying level, in order to lift the water further upwards to a higher lying water reservoir, if this is preferred by local conditions.

The foregoing description of the preferred embodiment of the invention has been presented for purposes of illustration and description. It is not intended to be exhaustive or to limit the invention to the precise form disclosed, and obviously many modifications and variations are possible in light of the above teaching.

I claim:

1. An apparatus for feeding water into a reservior located above an ocean level, said apparatus comprising:
   a first chamber having a downwardly opening housing for receiving a level of water which rises and falls in response to the waves of an ocean outside said chamber, said housing defining a first air cushion-forming portion above the level of water for compression and expansion of air therein in response to movement of said level of water;
   a first work chamber adjacent said first chamber for receiving a level of water and having a second air cushion-forming portion at an upper end in communication with said first air cushion-forming portion;
   a water intake conduit for feeding water from below into said work chamber;
   a first back pressure valve between said intake conduit and said work chamber to prevent a backflow of water from said work chamber into said conduit;
   a water lifting arrangement including a water guide pipe extending from said first work chamber to convey water therein in response to a rise of the water level in said first chamber and a first pair of back pressure valve in an upper end of said guide pipe to contain water therebetween;
   a piston and cylinder arrangement between said first air cushion-forming portion and a space in said guide pipe between said pair of back pressure valves for forcing water in said space past an upper valve of said pair of valves in response to a rise of the water level in said first chamber;
   a first rising pipe connected to said water intake conduit to receive water therefrom and to said first air cushion-forming portion to receive air therefrom for building up added water pressure upstream of said first back pressure valve; and
   a second pair of back pressure valves in said water intake conduit on opposite sides of said rising pipe.

2. An apparatus as set forth in claim 1 which further comprises a closed rising pipe connected to said water intake conduit between said first valve and said second pair of valves to receive water therefrom.

3. An apparatus as set forth in claim 1 wherein said water lifting arrangement includes a closed rising pipe connected to said water guide pipe downstream of said second pair of valves to receive water therefrom and which further comprises a second work chamber connected to said water guide pipe to receive water therefrom for subsequent delivery to a reservoir.

4. An apparatus as set forth in claim 1 wherein said piston and cylinder arrangement has a low pressure side communicating with said space in said guide pipe and a high pressure side communicating with said first air cushion-forming portion.

5. An apparatus for feeding water into a reservoir located above an ocean level, said apparatus comprising
   a first chamber having a downwardly opening housing for receiving a level of water which rises and falls in response to the waves of an ocean outside said chamber, said housing defining a first air cushion-forming portion above the level of water for compression and expansion of air therein in response to movement of said level of water;
   a first work chamber adjacent said first chamber for receiving a level of water and having a second air cushion-forming portion at an upper end in communication with said first air cushion-forming portion;
   a water intake conduit for feeding water from below into said work chamber;
   a first back pressure valve between said intake conduit and said work chamber to prevent a backflow of water from said work chamber into said conduit;
   a water guide pipe extending from said first work chamber to convey water therefrom in response to a rise of the water level in said first chamber;
   a first rising pipe connected to said water intake conduit to receive water therefrom and to said first air cushion-forming portion to receive air therefrom for building up added water pressure upstream of said first back pressure valve; and a second pair of back pressure valves in said water intake conduit on opposite sides of said rising pipe.

6. A apparatus as set forth in claim 5 which further comprises a closed rising pipe connected to said water intake conduit between said first valve and said second pair of valves to receive water therefrom.

7. An apparatus as set forth in claim 6 which further comprises a second work chamber connected to said water guide pipe to receive water therefrom, a second pair of back pressure valves in said guide pipe to define a space adjacent said second work chamber to contain water therebetween, and a piston and cylinder arrangement between said first air cushion-forming portion and said space for forcing water from said space into said second work chamber in response to a rise in the water level in said first chamber.

8. An apparatus as set forth in claim 7 wherein said water lifting arrangement includes a closed rising pipe connected to said water guide pipe downstream of said second pair of valves to receive water therefrom.

* * * * *